(12) United States Patent
Zhu et al.

(10) Patent No.: US 10,887,831 B2
(45) Date of Patent: Jan. 5, 2021

(54) SYSTEMS AND METHODS FOR PROVIDING INDICATIONS OF ADVANCED NETWORK FEATURES, ASSOCIATED WITH A NETWORK AREA, TO A USER DEVICE

(71) Applicant: Verizon Patent and Licensing Inc., Arlington, VA (US)

(72) Inventors: Lily Zhu, Parsippany, NJ (US); Christopher M. Schmidt, Branchburg, NJ (US); Balaji L. Raghavachari, Bridgewater, NJ (US); Andrew E. Youtz, Princeton, NJ (US); Xin Wang, Morris Plains, NJ (US); Samirkumar Patel, Middlesex, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/430,974

(22) Filed: Jun. 4, 2019

(65) Prior Publication Data

US 2020/0389842 A1 Dec. 10, 2020

(51) Int. Cl.
*H04W 48/18* (2009.01)
*H04W 48/10* (2009.01)

(52) U.S. Cl.
CPC ........... *H04W 48/18* (2013.01); *H04W 48/10* (2013.01)

(58) Field of Classification Search
CPC .... H04W 84/045; H04W 74/00; H04W 76/11
See application file for complete search history.

(56) References Cited

U.S. PATENT DOCUMENTS

| | | | |
|---|---|---|---|
| 2009/0047960 A1* | 2/2009 | Gunnarsson | H04J 11/0093 455/436 |
| 2014/0335862 A1* | 11/2014 | Wang | H04W 36/24 455/436 |
| 2016/0183156 A1* | 6/2016 | Chin | H04L 61/2007 370/331 |
| 2017/0339619 A1* | 11/2017 | Meylan | H04W 36/14 |
| 2019/0069229 A1* | 2/2019 | Lee | H04W 36/0085 |

* cited by examiner

*Primary Examiner* — Joshua L Schwartz

(57) ABSTRACT

A network device identifies, prior to a user device establishing a connection with a network advanced network features associated with network areas. The network device selects a network indication that indicates one or more of the advanced network features associated with one of the network areas, and provides the network indication to the user device.

20 Claims, 10 Drawing Sheets

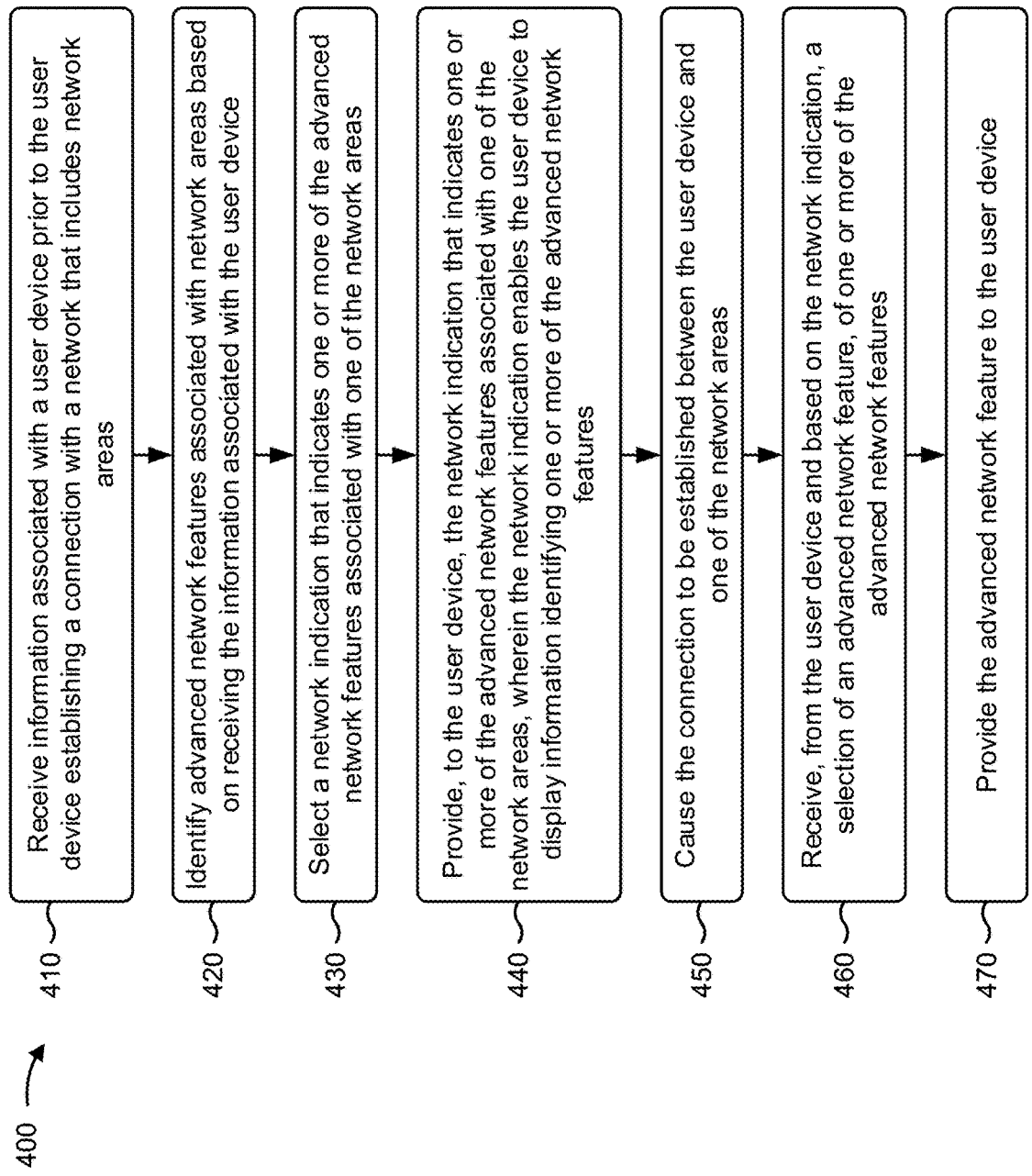

SYSTEMS AND METHODS FOR PROVIDING INDICATIONS OF ADVANCED NETWORK FEATURES, ASSOCIATED WITH A NETWORK AREA, TO A USER DEVICE

BACKGROUND

A user device (e.g., user equipment or UE) may access and utilize a network (e.g., a cellular network) based on selecting information identifying the network. For example, the user device may access a third generation (3G) network, a fourth generation (4G) or long-term evolution (LTE) network, a fifth generation (5G) or new radio (NR) network, and/or the like.

BRIEF DESCRIPTION OF THE DRAWINGS

FIG. 4 is a flow chart of an example process for providing indications of advanced network features, associated with a network area and prior to feature configuration, to a user device.

DETAILED DESCRIPTION OF PREFERRED EMBODIMENTS

Figure 1A:
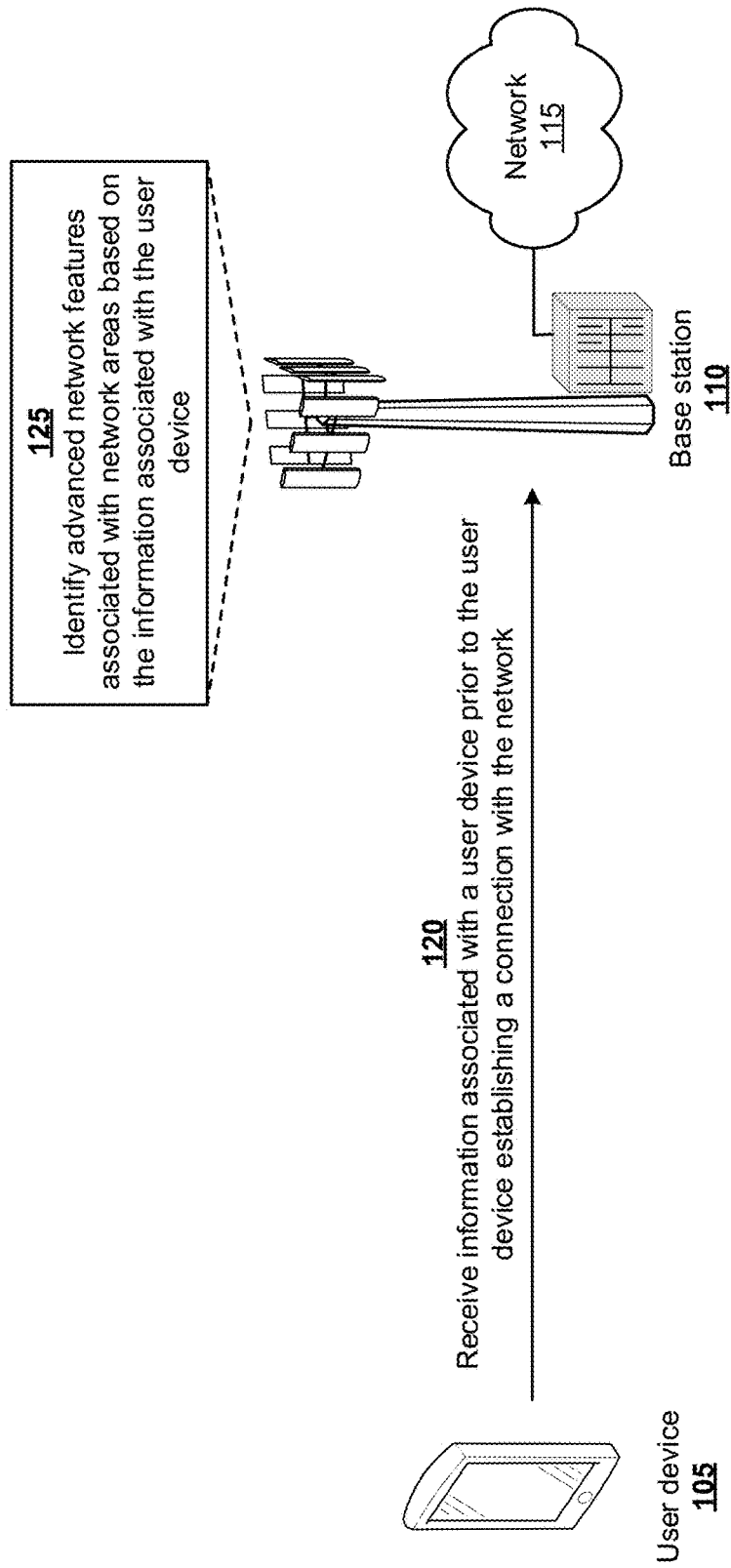
FIGS. 1A-1G are diagrams of one or more example implementations described herein.

The following detailed description of example implementations refers to the accompanying drawings. The same reference numbers in different drawings may identify the same or similar elements.

A user of a user device may access a 4G network and may utilize features associated with the 4G network. The 4G network may provide, to the user device, various advanced network features that impact a user experience (e.g., optimize performance of the user device), such as an advanced network feature associated with an uplink data rate, an advanced network feature associated with a downlink data rate, an advanced network feature associated with latency, an advanced network feature associated with carrier aggregation, an advanced network feature associated with uplink quadrature amplitude modulation (e.g., UL 256 QAM), and/or the like. An operator may want to take advantage of this information and make the fact that the user device is in the coverage of advanced network known to a mobile network user. However, for some performance enhancements, the user device reports its capability and will not know network capability until those advanced features are activated in real-time (e.g., DL 256 QAM). The 4G network may not provide information indicating the various advanced network features to the user device until feature configuration is activated in a radio resource control (RRC) connected mode. Thus, the user device may not utilize the advanced network features for any purpose (e.g., show coverage area of advanced features, optimize device processing, and/or the like) until the feature configuration is activated. This causes computing resources (e.g., processing resources, memory resources, and/or the like) associated with the user device to be wasted until the advanced network features are activated. This also causes computing resources, networking resources, and/or the like, associated with the network, to be wasted supporting an inefficiently operating user device.

Some implementations described herein provide a network device that provides indications of advanced network features, associated with a network area and prior to feature configuration, to a user device. For example, the network device may receive information associated with the user device prior to the user device establishing a connection with a network (e.g., while the user device is idle), and may identify advanced network features associated with network areas based on receiving the information associated with the user device. The network device may select a network indication broadcasted while device is in idle state that indicates one or more advanced network features associated with one of the network areas, and may provide the network indication to the user device. In some implementations, the network indication may include an indication of type of network associated with the user device. The network device may cause the connection to be established between the user device and one of the network areas.

In this way, the network device may provide indications of advanced network features, associated with a network area and prior to feature configuration, to a user device. The user device or a user of the user device may utilize the indications to select advanced network features that optimize performance of the user device. This may conserve resources (e.g., processing resources, memory resources, and/or the like) associated with the user device. Implementations described herein may also conserve resources of the network that would otherwise be wasted by the resources of the network providing non-optimal network features for the user device.

FIGS. 1A-1G are diagrams of one or more example implementations 100 described herein. As shown in FIGS. 1A-1G, a user device 105 may be associated with a network device (e.g., a base station 110) and an associated network 115. For example, user device 105 may be proximate to base station 110 (e.g., to one or more cells associated with base station 110) of network 115. In some implementations, base station 110 may broadcast a signal that is received by user device 105. User device 105 may receive the signal prior to establishing a connection with base station 110. Although implementations are described herein as being performed by base station 110, the implementations may be performed by other network devices associated with network 115, such as a mobility management entity device (MME), a serving gateway (SGW) 210, a packet data network gateway (PGW), a policy and charging rules function (PCRF), and/or the like.

As further shown in FIG. 1A, and by reference number 120, base station 110 may receive, from user device 105, information associated with user device 105 prior to user device 105 establishing a connection with network 115. In some implementations, the information associated with user device 105 may include information identifying user device 105 (e.g., a mobile identifier, such as a unique device identifier, a telephone number, a serial number, and/or the like), information indicating capabilities of user device 105 (e.g., a 4G device, a 5G device, and/or the like), and/or the like.

As further shown in FIG. 1A, and by reference number 125, a network device of network 115, such as base station 110 or another network device, may identify advanced network features associated with network areas based on the information associated with user device 105. In some implementations, the network areas may include cells associated with base station 110 and/or network 115, tracking areas associated with base station 110 and/or network 115, and/or the like. In some implementations, user device 105 may be associated with (e.g., receive signals from) one or more particular cells and/or one or more particular tracking areas associated with base station 110 and/or network 115.

Each network area may be associated with one or more advanced network features. For example, a first cell may be associated with first and second advanced network features, and a second cell may be associated with third and fourth advanced network features. In some implementations, the advanced network features may include features associated with an uplink data rate of the network area, a downlink data rate of the network area, latency of the network area, carrier aggregation in the network area, uplink quadrature amplitude modulation in the network area, and/or the like.

Figure 1B:
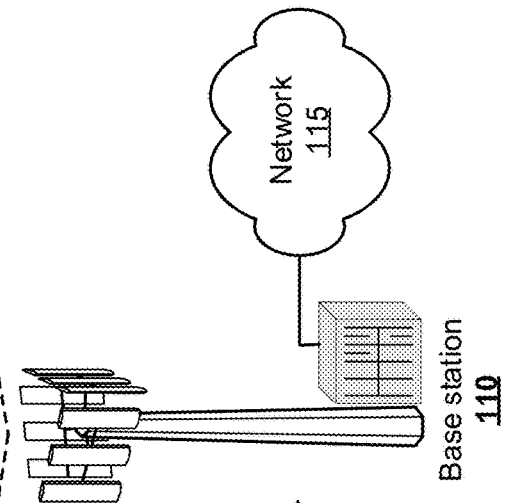

As shown in FIG. 1B, network 115 (e.g., base station 110) may identify advanced network features associated with a first network area. The first network area may include a network area that is associated with user device 105. For example, the first network area may include a cell of network 115 with which user device 105 is in range. As further shown in FIG. 1B, and by reference number 130, network 115 (e.g., base station 110) may select a first network indication that indicates the advanced network features associated with the first network area.

In some implementations, the first network indication may include a reserved public land mobile network (PLMN) indication. Base station 110 may broadcast the reserved PLMN on top of existing information provided in system information block type 1 (SIB1) signaling generated by base station 110. SIB1 signaling may include information that assists user device 105 when user device 105 is evaluating cell access. Multiple PLMN indications may be broadcast in SIB1 signaling, including the reserved PLMN indication. In some implementations, a field of the reserved PLMN indication (e.g., a "cellReservedForOperatorUse" field) may be set to "reserved" so that user device 105 will not utilize the reserved PLMN for accessing network 115. This may prevent user device 105 from attempting multiple PLMNs and locking up when user device 105 fails to connect to network 115.

As further shown in FIG. 1B, and by reference number 135, base station 110 may provide, to user device 105, the first network indication (e.g., the reserved PLMN on top of existing information provided in other signaling) that indicates the advanced network features associated with the first network area. User device 105 may receive the first network indication and may provide the first network indication for display to a user of user device 105 (e.g., via a user interface). For example, as shown, user device 105 may display the advanced network features associated with the first network area, such as carrier aggregation associated with the first network area, latency associated with the first network area, uplink data rates associated with the first network area, downlink data rates associated with the first network area, a type of network associated with the first network area, and/or the like.

Figure 1C:
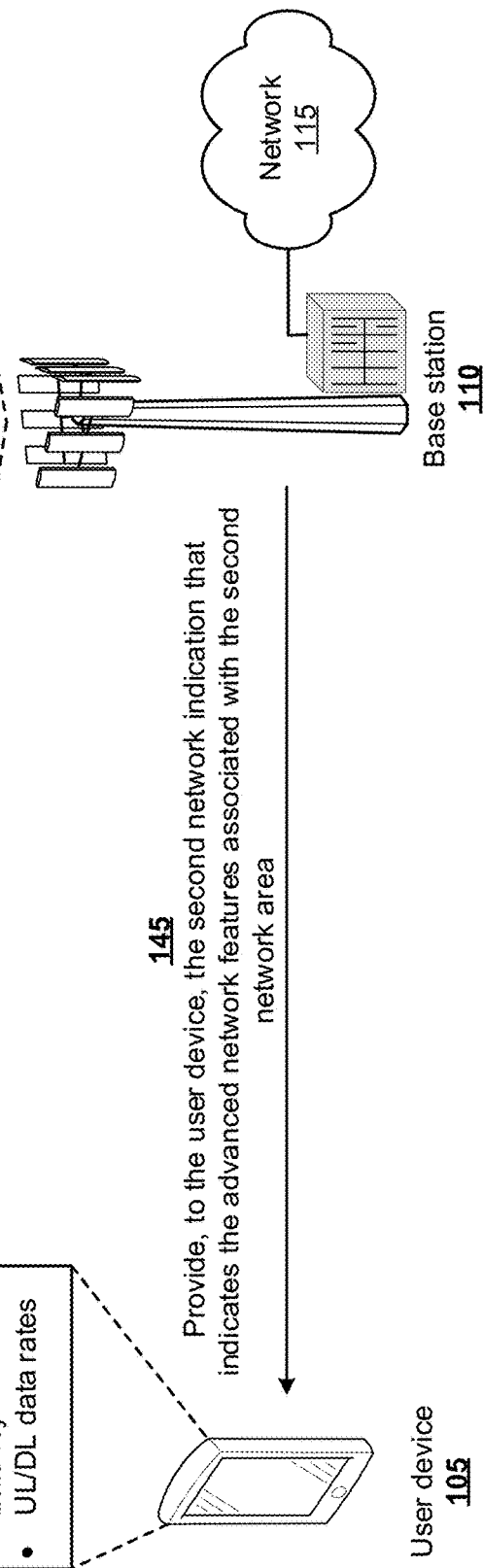
Figure 1C:
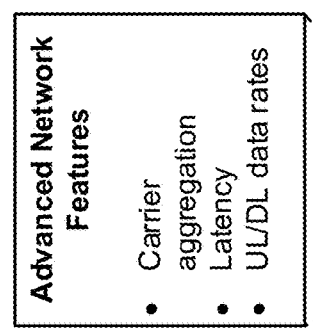

As shown in FIG. 1C, a second network 115 (e.g., a second base station 110) may be associated with user device 105 and may identify advanced network features associated with a second network area. The second network area may include a network area that is different than the first network area and is associated with user device 105. For example, the second network area may include a tracking area of the second network 115 with which user device 105 is in range. As further shown in FIG. 1C, and by reference number 140, the second network 115 (e.g., the second base station 110) may select a second network indication that indicates the advanced network features associated with the second network area.

In some implementations, the second network indication may include a particular value in a network name field of an evolved packet system mobility management (EMM) information message. Base station 110 may utilize a different value in the network name field of the EMM information message to indicate support of advanced network features. Network 115 (e.g., base station 110) may push the EMM information message with the updated network name field to user device 105 as user device 105 crosses tracking area code (TAC) boundaries where capabilities of network 115 change. This TAC-based solution may support EMM (e.g., mobility) as network capabilities may change among TACs. When network capabilities change, user device 105 may send, to base station 110, a tracking area update (TAU) message to open new network capabilities (e.g., depending on configuration of network 115).

As further shown in FIG. 1C, and by reference number 145, the second base station 110 may provide, to user device 105, the second network indication (e.g., a particular value in a network name field of an EMM information message) that indicates the advanced network features associated with the second network area. User device 105 may receive the second network indication and may provide the second network indication for display to the user of user device 105 (e.g., via a user interface). For example, as shown, user device 105 may display the advanced network features associated with the second network area, such as carrier aggregation associated with the second network area, latency associated with the second network area, uplink data rates associated with the second network area, downlink data rates associated with the second network area, a type of network associated with the second network area, and/or the like.

Figure 1D:
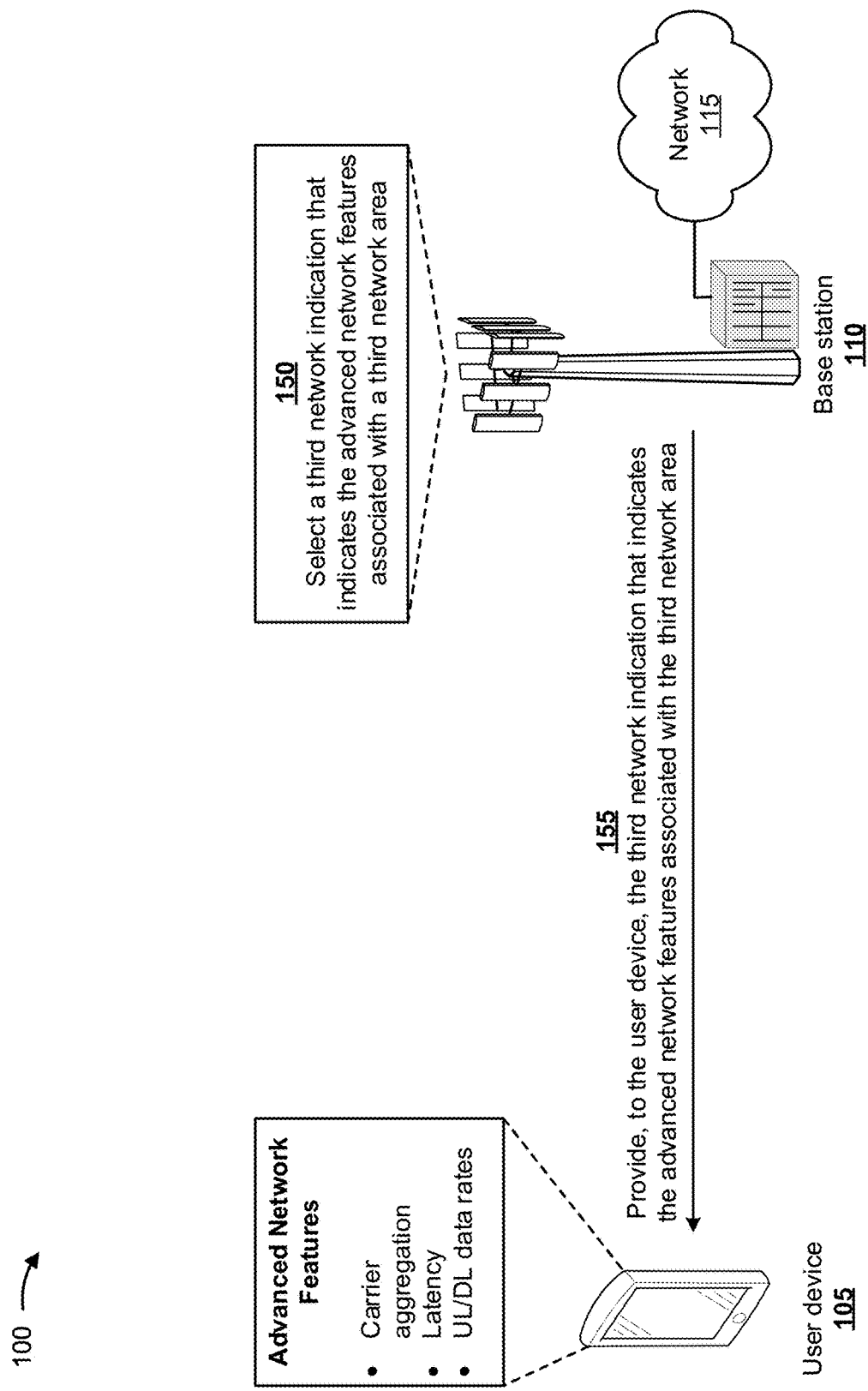

As shown in FIG. 1D, a third network 115 (e.g., a third base station 110) may be associated with user device 105 and may identify advanced network features associated with a third network area. The third network area may include a network area that is different than the first network area and the second network area and is associated with user device 105. For example, the third network area may include a tracking area of the third network 115 with which user device 105 is in range. As further shown in FIG. 1D, and by reference number 150, the third network 115 (e.g., the third base station 110) may select a third network indication that indicates the advanced network features associated with the third network area.

In some implementations, the third network indication may include a specific tracking area code (TAC) range. The third network 115 (e.g., the third base station 110) may provide information associated with cells that include advanced network features into a TAC range that is different from information associated with cells that do not include the advanced network features. In some implementations, the third base station 110 may change the third network indication based on the TAC range.

As further shown in FIG. 1D, and by reference number 155, the third base station 110 may provide, to user device 105, the third network indication (e.g., a specific TAC range) that indicates the advanced network features associated with the third network area. User device 105 may receive the third network indication and may provide the third network indication for display to the user of user device 105 (e.g., via a user interface). For example, as shown, user device 105 may display the advanced network features associated with the third network area, such as carrier aggregation associated with the third network area, latency associated with the third network area, uplink data rates associated with the third network area, downlink data rates associated with the third network area, a type of network associated with the third network area, and/or the like.

Figure 1E:
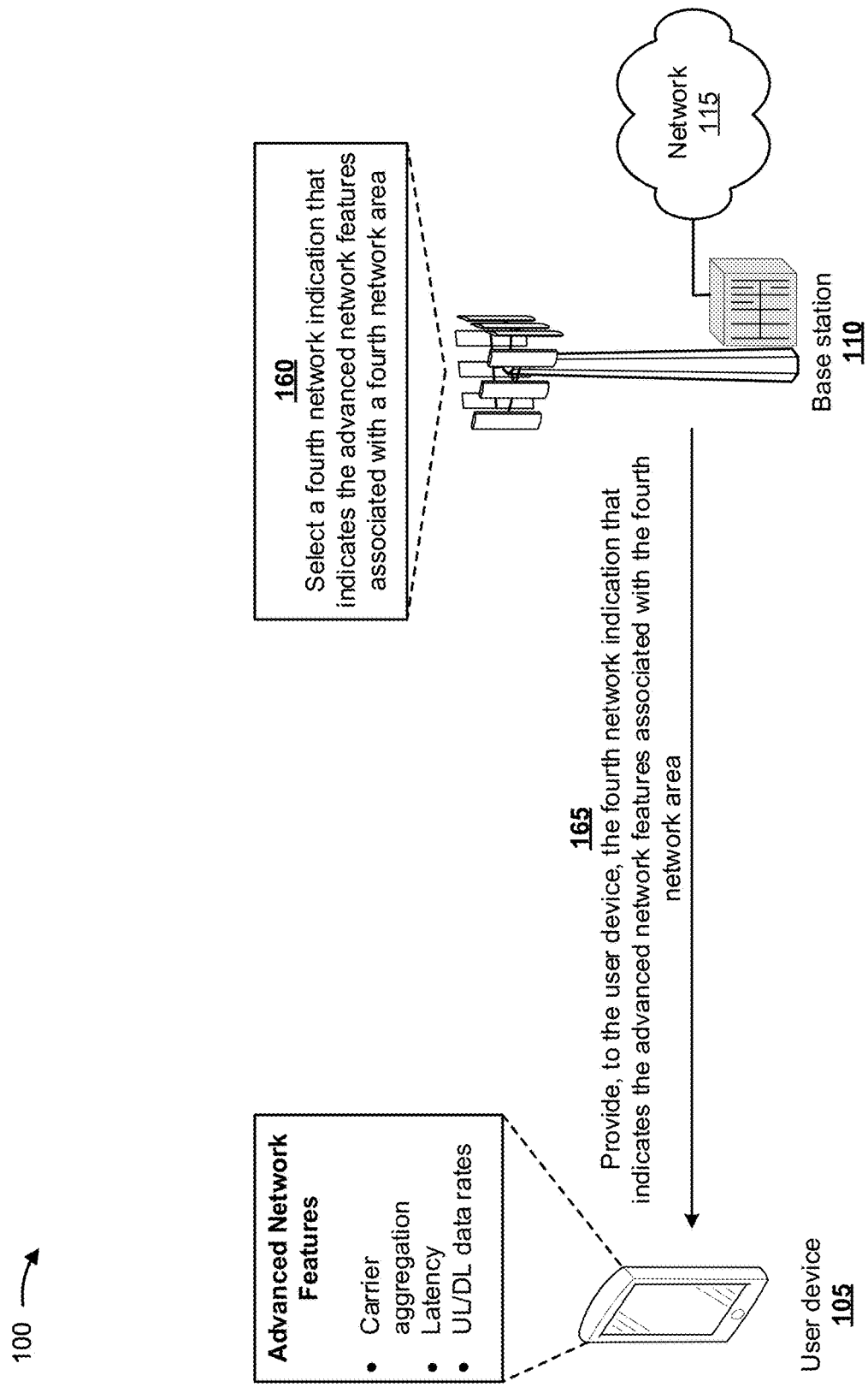

As shown in FIG. 1E, a fourth network 115 (e.g., a fourth base station 110) may be associated with user device 105 and may identify advanced network features associated with a fourth network area. The fourth network area may include a network area that is different than the first, second, and third network areas and is associated with user device 105. For example, the fourth network area may include a tracking area of the fourth network 115 with which user device 105 is in range. As further shown in FIG. 1E, and by reference number 160, the fourth network 115 (e.g., the fourth base station 110) may select a fourth network indication that indicates the advanced network features associated with the fourth network area.

In some implementations, the fourth network indication may include an equivalent public land mobile network (PLMN) information element. The fourth base station 110 may provide the equivalent PLMN information element in a message (e.g., an attach/TAU-accept message) generated by the fourth base station 110. In some implementations, the fourth base station 110 may change the fourth network indication based on the equivalent PLMN information element in a manner similar to the reserved PLMN indication. The fourth network indication may require user device 105 to perform a TAU as user device 105 crosses TAC boundaries where capabilities of network 115 may change.

As further shown in FIG. 1E, and by reference number 165, the fourth base station 110 may provide, to user device 105, the fourth network indication (e.g., an equivalent PLMN information element) that indicates the advanced network features associated with the fourth network area. User device 105 may receive the fourth network indication and may provide the fourth network indication for display to the user of user device 105 (e.g., via a user interface). For example, as shown, user device 105 may display the advanced network features associated with the fourth network area, such as carrier aggregation associated with the fourth network area, latency associated with the fourth network area, uplink data rates associated with the fourth network area, downlink data rates associated with the fourth network area, a type of network associated with the fourth network area, and/or the like.

Figure 1F:
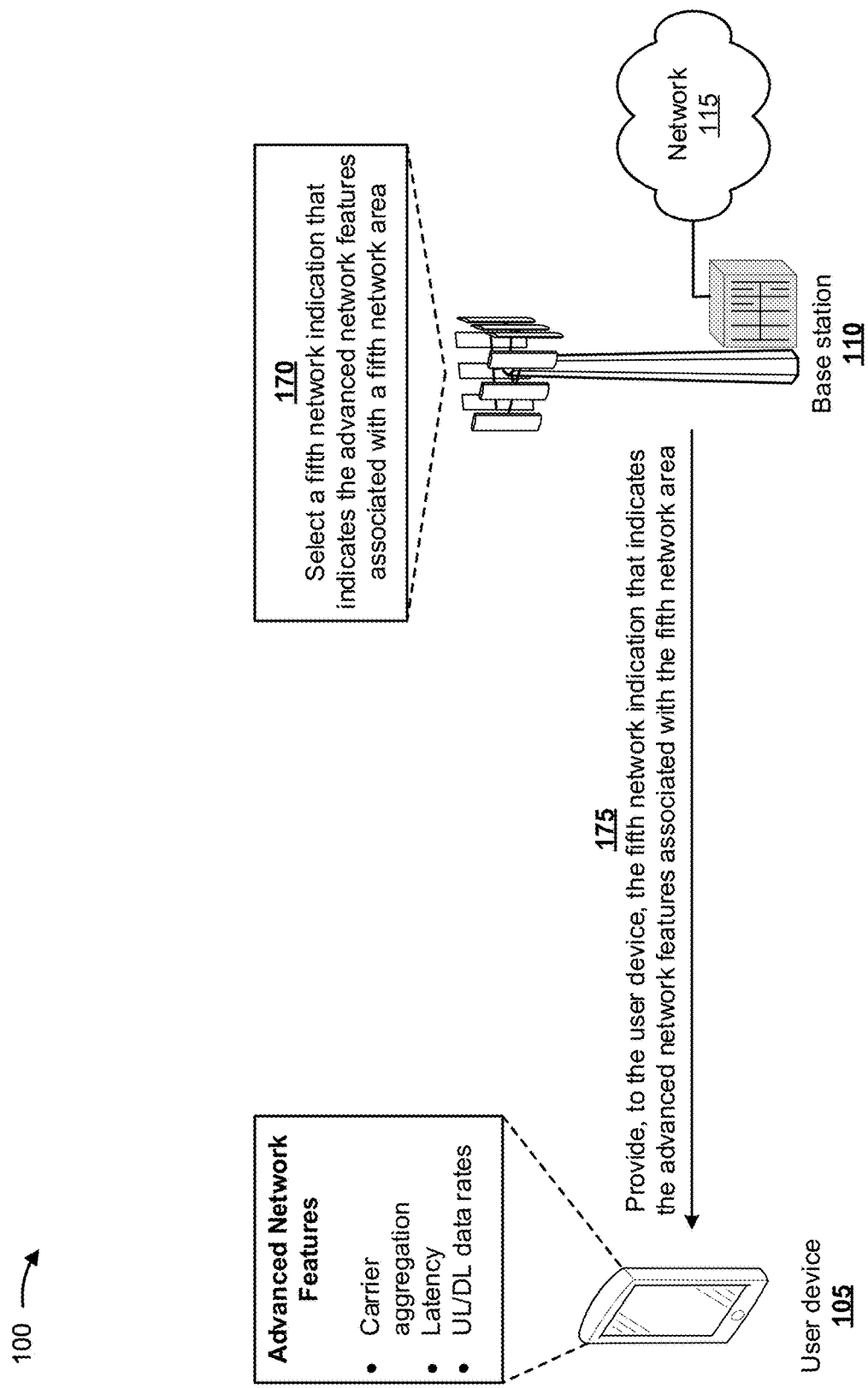

As shown in FIG. 1F, a fifth network 115 (e.g., a fifth base station 110) may be associated with user device 105 and may identify advanced network features associated with a fifth network area. The fifth network area may include a network area that is different than the first, second, third, and fourth network areas and is associated with user device 105. For example, the fifth network area may include a cell of the fifth network 115 with which user device 105 is in range. As further shown in FIG. 1F, and by reference number 170, the fifth network 115 (e.g., the fifth base station 110) may select a fifth network indication that indicates the advanced network features associated with the fifth network area.

In some implementations, the fifth network indication may include a cell identifier range. The fifth network 115 (e.g., the fifth base station 110) may provide information associated with cells that include advanced network features into a cell identifier range that is different from information associated with cells that do not include the advanced network features. In some implementations, the fifth base station 110 may change the fifth network indication based on the cell identifier range.

As further shown in FIG. 1F, and by reference number 175, the fifth base station 110 may provide, to user device 105, the fifth network indication (e.g., a cell identifier range) that indicates the advanced network features associated with the fifth network area. User device 105 may receive the fifth network indication and may provide the fifth network indication for display to the user of user device 105 (e.g., via a user interface). For example, as shown, user device 105 may display the advanced network features associated with the fifth network area, such as carrier aggregation associated with the fifth network area, latency associated with the fifth network area, uplink data rates associated with the fifth network area, downlink data rates associated with the fifth network area, a type of network associated with the fifth network area, and/or the like.

In some implementations, the fifth base station 110 may select one of the network indications based on a particular network area associated with user device 105 and the advanced network features associated with the particular network area. For example, if the particular network area is a cell associated with user device 105, the fifth base station 110 may select the first network indication and/or the fifth network indication. If the particular network area is a tracking area associated with user device 105, the fifth base station 110 may select the second network indication, the third network indication, and/or the fourth network indication. In some implementations, the fifth base station 110 may select two or more network indications when user device 105 is associated with two or more network areas, and may combine the two or more indications into a single indication provided to user device 105. The single indication may include information that distinguishes each of the two or more indications, and user device 105 may distinguish the two or more indications based on such information. In some implementations, each indication may include information that distinguishes different advanced network features (e.g., carrier aggregation, latency, uplink data rates, downlink data rates, etc.).

Figure 1G:
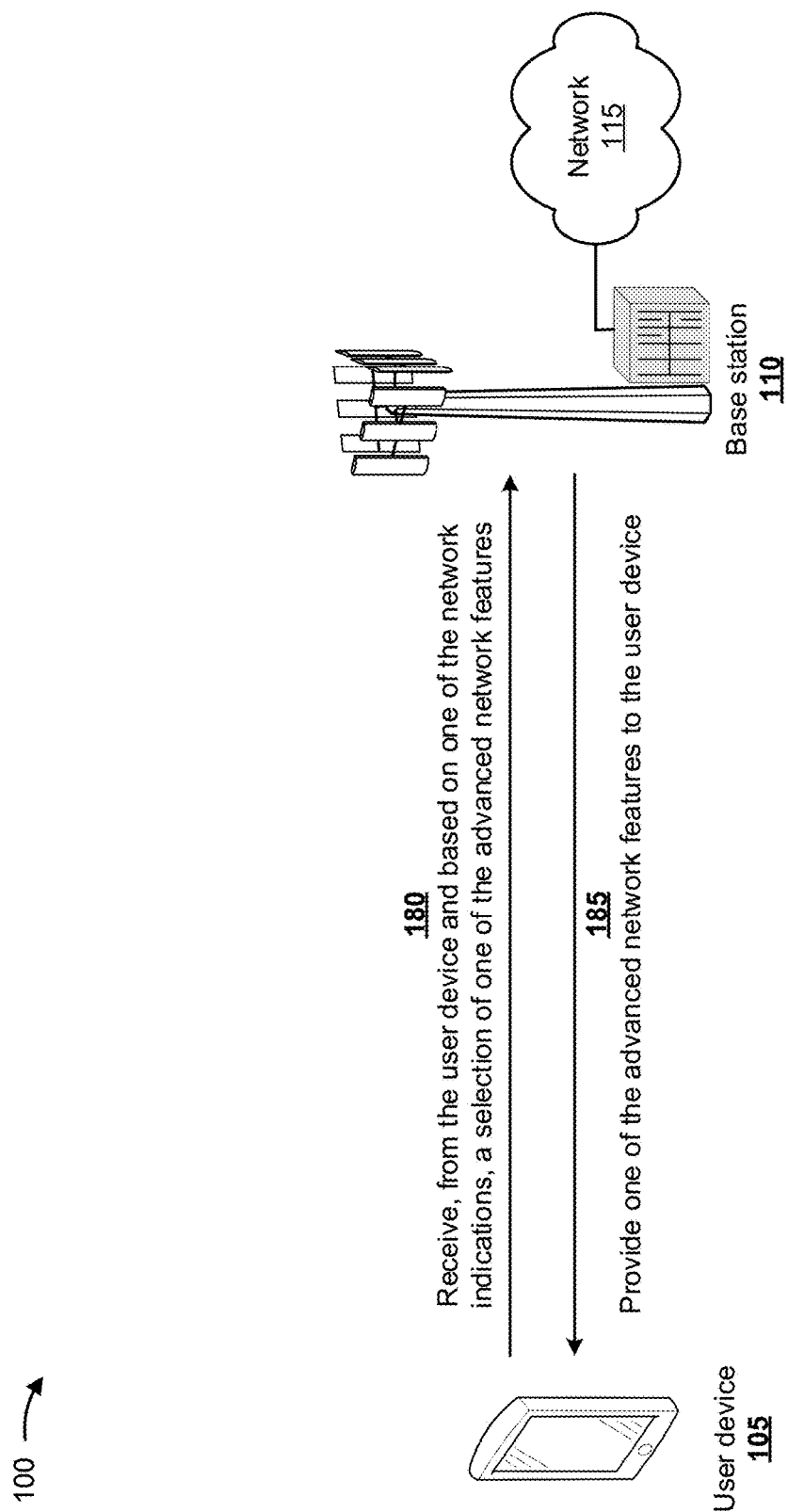

As shown in FIG. 1G, and by reference number 180, base station 110 may receive, from user device 105 and based on one of the network indications, a selection of one of the advanced network features (e.g., automatically selected by user device 105 or input by a user of user device 105). In some implementations, user device 105 may automatically select one or more of the advanced network features, rather than rely on user input, since user device 105 may determine optimal advanced network features to utilize, the user may select sub-optimal advanced network features for user device 105, and/or the like.

As further shown in FIG. 1G, and by reference number 185, base station 110 may provide the one of the advanced network features to user device 105. For example, base station 110 may provide the uplink data rates associated with the fifth network area to user device 105 once user device 105 connects with network 115 (e.g., the fifth network area of network 115). In some implementations, user device 105 may connect with network 115 prior to providing the selection of the one of the advanced network features to base station 110. In some implementations, user device 105 may select two or more advanced network features and may receive the two or more advanced network features from network 115.

In this way, base station 110 may provide, to user device 105, indications of advanced network features, associated with a network area of network 115 and prior to feature configuration. User device 105 or a user of user device 105 may utilize the indications to select advanced network features that optimize performance of user device 105. This conserves resources (e.g., processing resources, memory resources, and/or the like) associated with user device 105 and conserves resources of network 115 that would otherwise be wasted by the resources of network 115 providing non-optimal network features for user device 105. Furthermore, currently there does not exist a technique that provides indications of advanced network features to a user device and that automatically selects one or more of the advanced network features before user device 105 is connected.

As indicated above, FIGS. 1A-1G are provided merely as examples. Other examples may differ from what was described with regard to FIGS. 1A-1G. The number and arrangement of devices and networks shown in FIGS. 1A-1G are provided as an example. In practice, there may be additional devices and/or networks, fewer devices and/or networks, different devices and/or networks, or differently arranged devices and/or networks than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) of FIGS. 1A-1G may perform one or more functions described as being performed by another set of devices of FIGS. 1A-1G.

Figure 2:
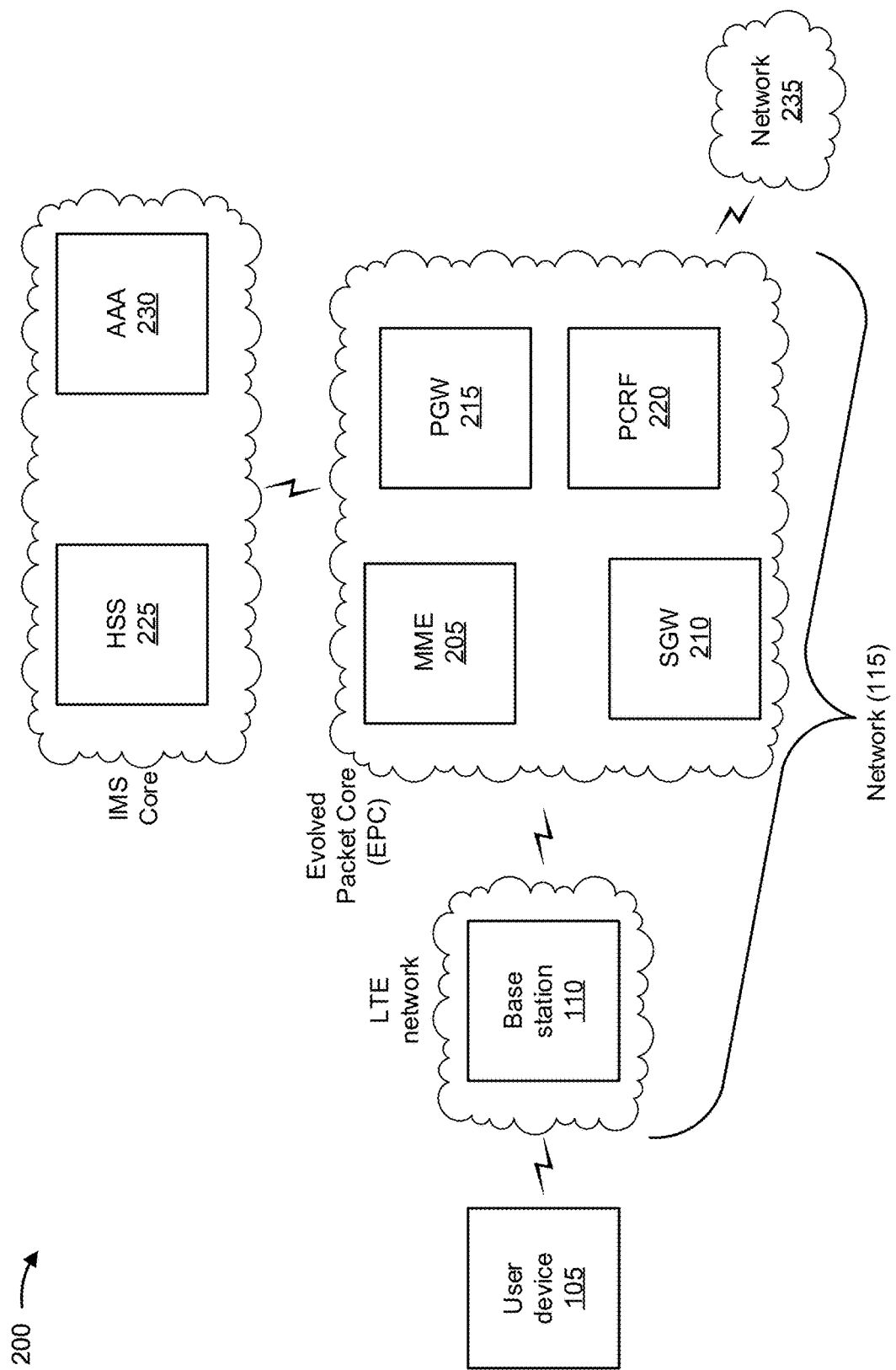
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include user device 105, base station 110, network 115, and a network 235. Devices and/or networks of environment 200 may interconnect via wired connections, wireless connections, or a combination of wired and wireless connections.

Some implementations are described herein as being performed within a long-term evolution (LTE) network for explanatory purposes. Some implementations may be performed within a network that is not an LTE network, such as a third generation (3G) network, a fifth generation (5G) network, and/or the like.

Network 115 may include an evolved packet system (EPS) that includes an LTE network and/or an evolved packet core (EPC). The LTE network may include a radio access network (RAN) that includes one or more base stations 110 that take the form of evolved Node Bs (eNBs) via which user device 105 communicates with the EPC. The EPC may include a mobility management entity device (MME) 205, a serving gateway (SGW) 210, a packet data network gateway (PGW) 215, and/or a policy and charging rules function (PCRF) 220 to enable user device 105 to communicate with network 235 and/or an Internet protocol (IP) multimedia subsystem (IMS) core. The IMS core may include a home subscriber server (HSS) 225 and/or an authentication, authorization, and accounting server (AAA) 230, and may manage device registration and authentication, session initiation, and/or the like, associated with user devices 105. HSS 225 and/or AAA 230 may reside in the EPC and/or the IMS core.

User device 105 includes one or more devices capable of communicating with other user devices 105, base station 110, network 115, and/or network 235. For example, user device 105 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. User device 105 may send traffic to and/or receive traffic from another user device 105 and/or network 235 (e.g., via base station 110, SGW 210, and/or PGW 215).

Base station 110 includes one or more devices capable of transferring traffic, such as audio, video, text, and/or other traffic, destined for and/or received from user device 105. In some implementations, base station 110 may include an eNB associated with the LTE network that receives traffic from and/or sends traffic to network 235 via SGW 210 and/or PGW 215. Additionally, or alternatively, one or more base stations 110 may be associated with a RAN that is not associated with the LTE network. Base station 110 may send traffic to and/or receive traffic from user device 105 via an air interface. In some implementations, base station 110 may include a small cell base station, such as a base station of a microcell, a picocell, a femtocell, and/or the like.

MME 205 includes one or more devices, such as one or more server devices, capable of managing authentication, activation, deactivation, and/or mobility functions associated with user device 105. In some implementations, MME 205 may perform operations relating to authentication of user device 105. Additionally, or alternatively, MME 205 may facilitate the selection of a particular SGW 210 and/or a particular PGW 215 to provide traffic to and/or from user device 105. MME 205 may perform operations associated with handing off user device 105 from a first base station 110 to a second base station 110 when user device 105 is transitioning from a first cell associated with the first base station 110 to a second cell associated with the second base station 110. Additionally, or alternatively, MME 205 may select another MME (not pictured), to which user device 105 should be handed off (e.g., when user device 105 moves out of range of MME 205).

SGW 210 includes one or more devices capable of routing packets. For example, SGW 210 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 210 may aggregate traffic received from one or more base stations 110 associated with the LTE network, and may send the aggregated traffic to network 235 (e.g., via PGW 215) and/or other network devices associated with the EPC and/or the IMS core. SGW 210 may receive traffic from network 235 and/or other network devices, and may send the received traffic to user device 105 via base station 110. Additionally, or alternatively, SGW 210 may perform operations associated with handing off user device 105 to and/or from an LTE network.

PGW 215 includes one or more devices capable of providing connectivity for user device 105 to external packet data networks (e.g., other than the depicted EPC and/or LTE network). For example, PGW 215 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 215 may aggregate traffic received from one or more SGWs 210, and may send the aggregated traffic to network 235. Additionally, or alternatively, PGW 215 may receive traffic from network 235, and may send the traffic to user device 105 via SGW 210 and base station 110. PGW 215 may record data usage information (e.g., byte usage), and may provide the data usage information to AAA 230.

PCRF 220 includes one or more devices, such as one or more server devices, capable of providing policy control decision and flow-based charging control functionalities. For example, PCRF 220 may provide network control regarding service data flow detection, gating, quality of service (QoS) and flow-based charging, and/or the like. In some implementations, PCRF 220 may determine how a certain service data flow is to be treated, and may ensure that user plane traffic mapping and treatment is in accordance with a user subscription profile.

HSS 225 includes one or more devices, such as one or more server devices, capable of managing (e.g., receiving, generating, storing, processing, providing, and/or the like) information associated with user device 105. For example, HSS 225 may manage subscription information associated with user device 105, such as information that identifies a subscriber profile of a user associated with user device 105, information that identifies services and/or applications that are accessible to user device 105, location information associated with user device 105, a network identifier (e.g., a network address) that identifies user device 105, information that identifies a treatment of user device 105 (e.g., quality of service information, a quantity of minutes allowed per time period, a quantity of data consumption allowed per time period, etc.), and/or similar information. HSS 225 may provide this information to one or more other devices of environment 200 to support the operations performed by those devices.

AAA 230 includes one or more devices, such as one or more server devices, that perform authentication, authorization, and/or accounting operations for communication sessions associated with user device 105. For example, AAA 230 may perform authentication operations for user device 105 and/or a user of user device 105 (e.g., using one or more credentials), may control access, by user device 105, to a service and/or an application (e.g., based on one or more restrictions, such as time-of-day restrictions, location restrictions, single or multiple access restrictions, read/write restrictions, etc.), may track resources consumed by user device 105 (e.g., a quantity of voice minutes consumed, a quantity of data consumed, etc.), and/or may perform similar operations.

Network 235 includes one or more wired and/or wireless networks. For example, network 235 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
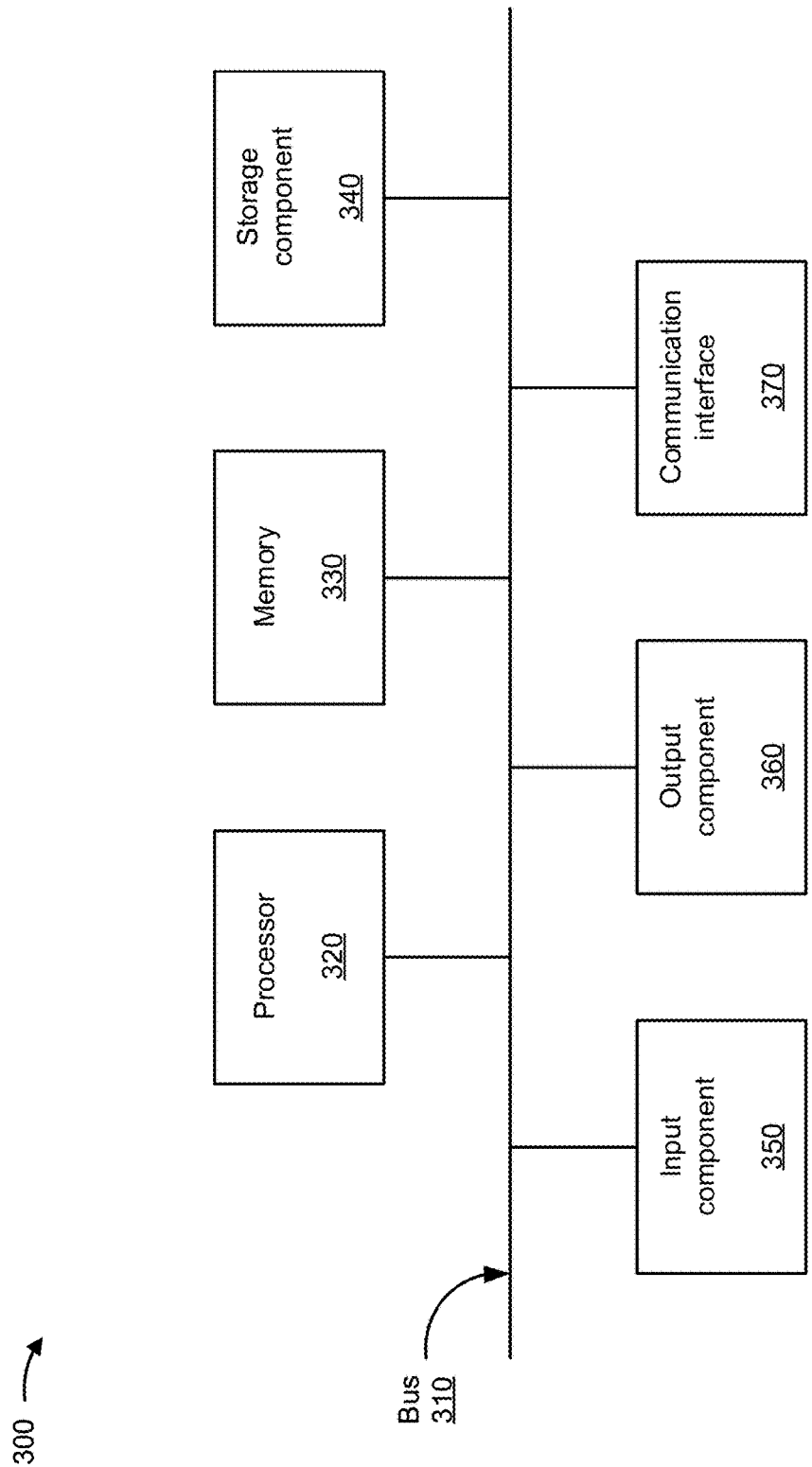
FIG. 3 is a diagram of example components of one or more devices of FIG. 2.

FIG. 3 is a diagram of example components of a device 300. Device 300 may correspond to user device 105, base station 110, MME 205, SGW 210, PGW 215, PCRF 220, HSS 225, and/or AAA 230. In some implementations, user device 105, base station 110, MME 205, SGW 210, PGW 215, PCRF 220, HSS 225, and/or AAA 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for providing indications of advanced network features, associated with a network area and prior to feature configuration, to a user device. In some implementations, one or more process blocks of FIG. 4 may be performed by a network device, such as a base station (e.g., base station 110). In some implementations, one or more process blocks of FIG. 4 may be performed by another device or a group of devices separate from or including the network device, such as a user device (e.g., user device 105) and/or a MME (e.g., MME 205).

As shown in FIG. 4, process 400 may include receiving information associated with a user device prior to the user device establishing a connection with a network (block 410). For example, the network device (e.g., using processor 320, memory 330, communication interface 370, and/or the like) may receive information associated with a user device prior to the user device establishing a connection with a network, as described above in connection with FIGS. 1A-2.

As further shown in FIG. 4, process 400 may include identifying advanced network features associated with network areas based on receiving the information associated with the user device (block 420). For example, the network device (e.g., using processor 320, storage component 340, and/or the like) may identify advanced network features associated with network areas based on receiving the information associated with the user device, as described above in connection with FIGS. 1A-2.

As further shown in FIG. 4, process 400 may include selecting a network indication that indicates one or more of the advanced network features associated with one of the network areas (block 430). For example, the network device (e.g., using processor 320, memory 330, and/or the like) may select a network indication that indicates one or more of the advanced network features associated with one of the network areas, as described above in connection with FIGS. 1A-2.

As further shown in FIG. 4, process 400 may include providing, to the user device, the network indication that indicates one or more of the advanced network features associated with the one of the network areas, wherein the network indication enables the user device to display information identifying one or more of the advanced network features (block 440). For example, the network device (e.g., using processor 320, memory 330, storage component 340, communication interface 370, and/or the like) may provide, to the user device, the network indication that indicates one or more of the advanced network features associated with the one of the network areas, as described above in connection with FIGS. 1A-2. In some implementations, the network indication may enable the user device to display information identifying one or more of the advanced network features.

As further shown in FIG. 4, process 400 may include causing the connection to be established between the user device and one of the network areas (block 450). For example, the network device (e.g., using processor 320, memory 330, communication interface 370, and/or the like) may cause the connection to be established between the user device and one of the network areas, as described above in connection with FIGS. 1A-2.

As further shown in FIG. 4, process 400 may include receiving, from the user device and based on the network indication, a selection of an advanced network feature, from one or more of the advanced network features (block 460). For example, the network device (e.g., using processor 320, storage component 340, communication interface 370, and/or the like) may receive, from the user device and based on the network indication, a selection of an advanced network feature, from one or more of the advanced network features, as described above in connection with FIGS. 1A-2.

As further shown in FIG. 4, process 400 may include providing the advanced network feature to the user device (block 470). For example, the network device (e.g., using processor 320, communication interface 370, and/or the like) may provide the advanced network feature to the user device, as described above in connection with FIGS. 1A-2.

Process 400 may include additional implementations, such as any single implementation or any combination of implementations described below and/or in connection with one or more other processes described elsewhere herein.

In some implementations, when the one of the network areas includes a cell of the network, the network device selects a network indication that includes a reserved public land mobile network (PLMN) indication, a cell identifier range, and/or the like. In some implementations, when one of the network areas includes a tracking area of the network, the network device selects a network indication that includes a particular value in a network name field of an evolved packet system mobility management (EMM) information message, a specific tracking area code (TAC) range, an equivalent public land mobile network (PLMN) information element, and/or the like.

In some implementations, the network device selects the network indication based on one or more of the advanced network features associated with one of the network areas.

In some implementations, the network device may include a base station and/or a mobility management entity (MME) of the network, and the network may include a long-term evolution network. In some implementations, the advanced network feature includes a feature associated with an uplink data rate of one of the network areas, a feature associated with a downlink data rate of one of the network areas, a feature associated with latency of one of the network areas, a feature associated with carrier aggregation in one of the network areas, or a feature associated with uplink quadrature amplitude modulation in one of the network areas.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device associated with a network that includes network areas, information associated with a user device prior to the user device establishing a connection with the network;
    identifying, by the device, network features associated with a particular network area, of the network areas, based on receiving the information associated with the user device;
    selecting, by the device, a network indication that:
        indicates one or more of the network features associated with the particular network area,
        includes a reserved public land mobile network (PLMN) indication having a field set to prevent the user device from utilizing the reserved PLMN indication for accessing the network, and
        includes a particular value in a network name field of an evolved packet system mobility management (EMM) information message;
    providing, by the device and to the user device as the user device crosses one or more tracking area code (TAC) boundaries where capabilities of the network change, the network indication,
        wherein the network indication enables the user device to display information identifying the one or more of the network features;
    causing, by the device and based on providing the network indication, a connection to be established between the user device and the particular network area;
    receiving, by the device, from the user device, and based on the network indication, a selection of a network feature of the one or more of the network features; and
    providing, by the device, the network feature to the user device.

2. The method of claim 1, wherein the particular network area includes a tracking area of the network, and
    wherein selecting the network indication comprises:
        selecting a network indication that includes a specific TAC range.

3. The method of claim 1, wherein the network area includes a tracking area of the network, and
    wherein selecting the network indication comprises:
        selecting a network indication that includes an equivalent PLMN information element.

4. The method of claim 1, wherein the particular network area includes a cell of the network, and
    wherein selecting the network indication comprises:
        selecting a network indication that includes a cell identifier range.

5. The method of claim 1, wherein the information associated with the user device comprises:
    information indicating one or more capabilities of the user device.

6. The method of claim 1, wherein providing the indication comprises:
    broadcasting the reserved PLMN on top of a system information block type 1 (SIB1) signal.

7. The method of claim 1, wherein providing the network indication to the user device as the user device crosses the one or more TAC boundaries where the capabilities of the network change comprises:
pushing the EMM information message to the user device as the user device crosses the one or more TAC boundaries where the capabilities of the network change.

8. A device associated with a network that includes network areas, comprising:
one or more memories; and
one or more processors configured to:
receive, from a user device, information associated with the user device prior to the user device establishing a connection with the network;
identify a network feature associated with a particular network area, of the network areas, based on receiving the information associated with the user device, wherein the particular network area includes at least one of:
a cell of the network, or
a tracking area of the network;
select a network indication that:
indicates the network feature associated with the particular network area,
includes a reserved public land mobile network (PLMN) indication having a field set to prevent the user device from utilizing the reserved PLMN indication for accessing the network, and
includes a particular value in a network name field of an evolved packet system mobility management (EMM) information message;
provide, to the user device as the user device crosses one or more tracking area code (TAC) boundaries where capabilities of the network change, the network indication,
wherein the network indication enables the user device to display information identifying the network feature;
cause, based on providing the network indication, a connection to be established between the user device and the particular network area;
receive, from the user device and based on the network indication, a selection of the network feature; and
provide the network feature to the user device.

9. The device of claim 8, wherein, when the particular network area includes the cell of the network, the network indication includes a cell identifier range.

10. The device of claim 8, wherein, when the particular network area includes the tracking area of the network, the network indication includes one of:
a specific TAC range, or
a PLMN information element.

11. The device of claim 8, wherein the device includes a base station of the network.

12. The device of claim 8, wherein the network feature includes one of:
a feature associated with an uplink data rate of the particular network area,
a feature associated with a downlink data rate of the particular network area,
a feature associated with latency of the particular network area,
a feature associated with carrier aggregation in the particular network area, or
a feature associated with uplink quadrature amplitude modulation in the particular network area.

13. The device of claim 8, wherein the network includes a long-term evolution network.

14. The device of claim 8, wherein the information associated with the user device comprises:
information indicating one or more capabilities of the user device.

15. A non-transitory computer-readable medium storing instructions, the instructions comprising:
one or more instructions that, when executed by one or more processors of a device associated with a network that includes network areas, cause the one or more processors to:
receive, from a user device, information associated with the user device prior to the user device establishing a connection with the network;
identify network features associated with a particular network area, of the network areas, based on receiving the information associated with the user device, wherein the particular network area includes at least one of:
a cell of the particular network, or
a tracking area of the particular network;
select a network indication that:
indicates the network features associated with the particular network area,
includes a reserved public land mobile network (PLMN) indication having a field set to prevent the user device from utilizing the reserved PLMN indication for accessing the network, and
includes a particular value in a network name field of an evolved packet system mobility management (EMM) information message;
provide, to the user device as the user device crosses one or more tracking area code (TAC) boundaries where capabilities of the network change, the network indication,
wherein the network indication enables the user device to display information identifying the network features;
cause, based on providing the network indication, a connection to be established between the user device and the particular network area;
receive, from the user device and based on the network indication, a selection of a network feature of the network features; and
provide the network feature to the user device,
wherein the network feature changes a performance of the user device.

16. The non-transitory computer-readable medium of claim 15, wherein, when the particular network area includes the cell of the network, the network indication includes a cell identifier range.

17. The non-transitory computer-readable medium of claim 15, wherein, when the particular network area includes the tracking area of the network, the network indication includes one of:
a specific tracking area code (TAC) range, or
an equivalent PLMN information element.

18. The non-transitory computer-readable medium of claim 15, wherein the network features include one or more of:
a feature associated with an uplink data rate of the particular network area,
a feature associated with a downlink data rate of the particular network area,
a feature associated with latency of the particular network area, a feature associated with carrier aggregation in the particular network area, or a feature associated with uplink quadrature amplitude modulation in the particular network area.

19. The non-transitory computer-readable medium of claim 15, wherein the device includes one or more of:

a base station, or a mobility management entity (MME).

20. The non-transitory computer-readable medium of claim 15, wherein the information associated with the user device comprises:

information indicating one or more capabilities of the user device.

* * * * *